No. 689,359. Patented Dec. 17, 1901.
E. HAIMAN.
CULTIVATOR.
(Application filed July 22, 1901.)
(No Model.) 2 Sheets—Sheet 1.
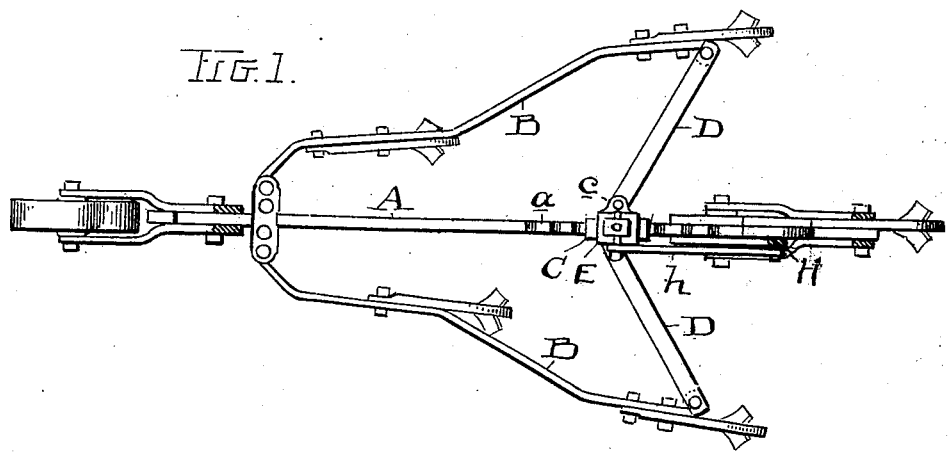
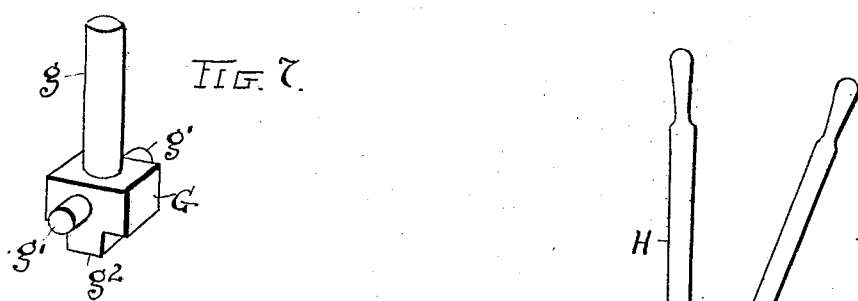
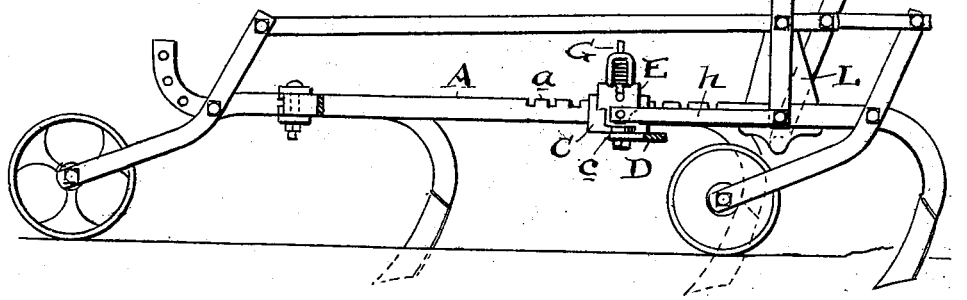
ATTEST
INVENTOR
Chas Haiman
By H. T. Fisher
ATTY No. 689,359. Patented Dec. 17, 1901.
E. HAIMAN.
CULTIVATOR.
(Application filed July 22, 1901.)
(No Model.) 2 Sheets—Sheet 2.
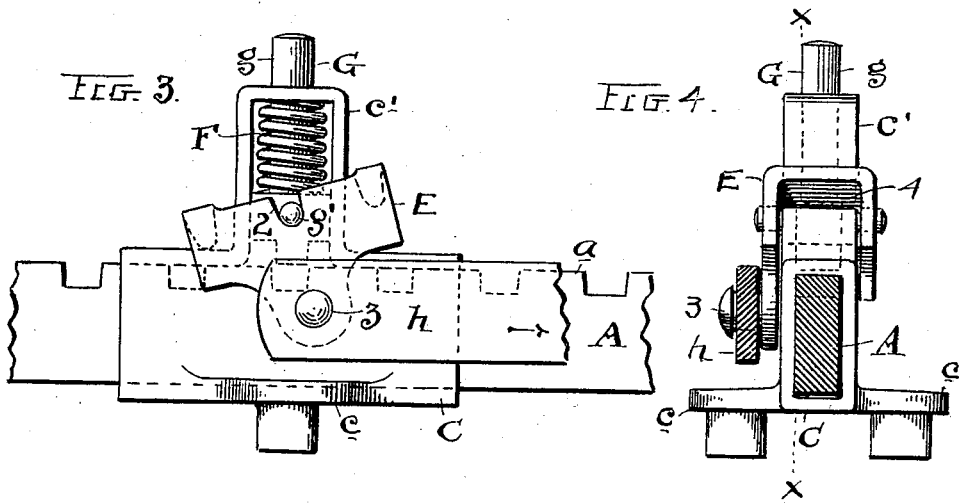
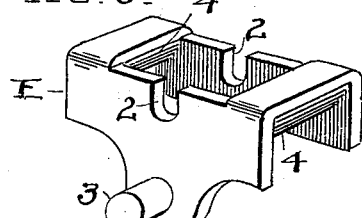
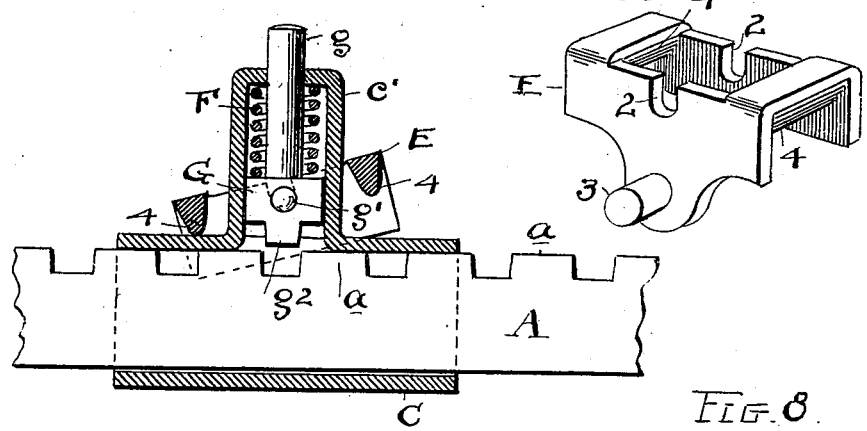
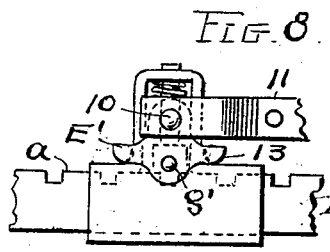
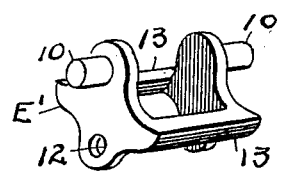
ATTEST
R. B. Mott
H. E. Mudra
INVENTOR
Chas. Haiman
BY H. Y. Fisher ATTY

UNITED STATES PATENT OFFICE.

ELIAS HAIMAN, OF CLEVELAND, OHIO, ASSIGNOR TO THE EMPIRE PLOW COMPANY, OF CLEVELAND, OHIO, A CORPORATION OF OHIO.

CULTIVATOR.

SPECIFICATION forming part of Letters Patent No. 689,359, dated December 17, 1901.

Application filed July 22, 1901. Serial No. 69,240. (No model.)

*To all whom it may concern:*

Be it known that I, ELIAS HAIMAN, a citizen of the United States, residing at Cleveland, in the county Cuyahoga and State of Ohio, have invented certain new and useful Improvements in Cultivators; and I do declare that the following is a full, clear, and exact description of the invention, which will enable others skilled in the art to which it appertains to make and use the same.

My invention relates to cultivators; and the object of the invention is to provide a cultivator with means for adjusting the positions of the side bars in respect to the central bar at the will of the operator through a lever, and which mechanism is adapted to be both unlocked and moved by the lever in the same operation and practically at the same time and to automatically lock itself again when movement ceases, all substantially as shown and described, and particularly pointed out in the claims.

In the accompanying drawings, Figure 1 is a plan view of a cultivator embodying my invention, in which certain unimportant parts are broken away to more clearly disclose others below. Fig. 2 is a side elevation of the cultivator with the near side bar removed. Fig. 3 is an enlarged side elevation of my improved automatic locking and unlocking device, showing a section of the central beam or bar and said mechanism in one of its forms illustrated thereon. Fig. 4 is an elevation of the parts seen in Fig. 3 looking in from the right. Fig. 5 is a vertical central sectional elevation on a line corresponding to $x\,x$, Fig. 4. Fig. 6 is a perspective view of one form of yoke shown in its associated positions with other parts in Figs. 3, 4, and 5. Fig. 7, page 1, is a perspective view of the dog or pawl used with this mechanism; and Figs. 8 and 9 show a modification.

As above indicated, I have produced a mechanism for spreading or contracting the side bars of a cultivator, whether it be of the type that is known as a "sulky-cultivator" or one with which the operator is required to walk, as in the style here shown, whereby all means for effecting adjustments which would ordinarily require the stopping of a team to make are wholly done away with, and the operator is given complete control of the implement in these respects while it is in motion and is enabled to spread or narrow the travel of the side bars and to play them laterally, if he prefers, by or through the manipulation of a single lever, as will appear more clearly in the further description of the invention.

In the construction of cultivator thus shown A represents the central beam or bar, and B the side bars. On the top of the central bar toward its rear end I provide a series of teeth $a$, cut into said beams in this instance; but they might be otherwise formed or provided. Upon bar A and adapted to slide over said teeth or notches I have placed a sliding member C of box shape, as here shown, and provided with ears or projections $c$ at its opposite sides to connect links D, which are joined at their outer ends to side bars B and serve to adjust and hold said bars laterally through the movements of said box on bar A, as will now appear.

E represents a so-called "yoke," one shape or style of which is clearly shown in Figs. 3 to 6, and in Fig. 6 especially. The said yoke is constructed and arranged to have a rocking or tilting movement within limits and is the intermediate member or part between box C and locking dog or pawl G, Figs. 5 and 7. Structurally the said yoke is adapted to be set down over the double-sided standard $c'$, forming a part of box C, and said standard is closed across its top and perforated to receive the stem or spindle $g$ of dog G, which extends up through the top of said standard and is confined and guided thereby. Trunnions $g'$ on the opposite sides of dog G engage down into the open slots 2 in the center and top of the sides of the yoke, and the said dog is held and confined laterally by the said yoke, while in the opposite direction it is confined by the sides of standard $c'$, so that it has to remain in working position and is limited to a direct up-and-down movement when moved at all. Normally its tooth $g^2$ at its bottom is pressed down by spring F into engagement with one of the notches or teeth $a$ in the top of bar A, and when so engaged the entire device is locked against all possible movement by accident or otherwise until a shift is purposely made by the means provided for this purpose. The immediate means is yoke E, and this is actuated through hand-lever H, connected by link $h$, which is pivoted on pin or projection 3 at one side of said yoke, Fig. 6. Yoke E further has a transverse bearing-rib 4 at each end adapted to rest down on the back of box C; but when the yoke is operated one or the other rib 4 becomes the pivot or fulcrum point on which the yoke rocks and rises at the other end, according to the direction the parts are to be moved and the side bars of the cultivator to be spread or contracted. Obviously in either case and whichever way adjustment is to be made the yoke E is tilted from or through lever H by the operator, and the first effect of such tilting or rocking is to raise dog G against its spring sufficiently to release its tooth $g^2$ from engagement with bar A, as seen in Figs. 3 and 5. Then all of them ed to be engaged merely a reversal of the other instead of only one such ...two... 6; but yoke E might also ... adapt tions like 3, if preferred. The same as device or dog G is used here as in the project form above, and its studs or pins $g'$ rest in holes 12 of the yoke, while cross-bars 13 on the yoke are the fulcrums or pivots on which the yoke rocks when tilted, the same as occurs in the form, Fig. 6, on cross-bars 4. The whole idea here is to first disengage dog or lock G by the action of lever H through this rocking member and when this is done slide the box C and the parts carried thereby in either direction as far as wanted. Then the dog G will automatically lock it again as before.

What I claim is—

1. In cultivators, a central beam and laterally-movable side beams, and adjustable bination with an operating-lever, and means on said central beam adapted to be both unlocked and adjusted in a single operation of said lever, said means comprising an automatically-locked dog and a rocking part connected with said lever and arranged to disengage said dog, substantially as described.

Witness my hand to the foregoing specification this 17th day of July, 1901.

ELIAS HAIMAN.

Witnesses:
R. B. MOSER,
H. E. MUDRA.